(12) United States Patent
Matsukuma et al.

(10) Patent No.: US 10,330,008 B2
(45) Date of Patent: Jun. 25, 2019

(54) COMPRESSED AIR ENERGY STORAGE AND POWER GENERATION METHOD AND APPARATUS

(71) Applicant: Kobe Steel, Ltd., Hyogo (JP)

(72) Inventors: Masaki Matsukuma, Takasago (JP); Hiroki Saruta, Takasago (JP); Kanami Sakamoto, Takasago (JP); Masatake Toshima, Kobe (JP); Yohei Kubo, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/568,676

(22) PCT Filed: Apr. 14, 2016

(86) PCT No.: PCT/JP2016/061984
§ 371 (c)(1),
(2) Date: Oct. 23, 2017

(87) PCT Pub. No.: WO2016/178358
PCT Pub. Date: Nov. 10, 2016

(65) Prior Publication Data
US 2018/0156110 A1 Jun. 7, 2018

(30) Foreign Application Priority Data

May 1, 2015 (JP) .................. 2015-094330

(51) Int. Cl.
*F02C 6/16* (2006.01)
*F03D 9/17* (2016.01)
(Continued)

(52) U.S. Cl.
CPC .............. *F02C 6/16* (2013.01); *F02C 1/04* (2013.01); *F02C 6/06* (2013.01); *F03D 9/17* (2016.05);
(Continued)

(58) Field of Classification Search
CPC ...... F02C 6/16; F02C 6/06; F02C 1/04; F02C 6/00; H02J 15/00; F17C 2270/0581; F17C 2227/0327; F17C 2221/031; Y02E 60/15
(Continued)

(56) References Cited

U.S. PATENT DOCUMENTS 3,831,373 A 8/1974 Flynt
7,681,395 B2 * 3/2010 Pinkerton ................ F02C 6/16
60/646

(Continued)

FOREIGN PATENT DOCUMENTS

CN 102459847 A 5/2012
CN 102953823 A 3/2013
(Continued)

OTHER PUBLICATIONS

International Search Report issued in PCT/JP2016/061984; dated Jul. 5, 2016.

*Primary Examiner* — Hoang M Nguyen
(74) *Attorney, Agent, or Firm* — Studebaker & Brackett PC

(57) ABSTRACT

A compressed-air storage and power generation method according to the present invention is provided with: a first air-compression step; a first air-storage step; a first air-supply step; a first power-generation step; a first heat-exchange step; a heat-medium storage step; a second heat-exchange step; and an air-discharge step. In the air-discharge step, when the amount of compressed air stored in a pressure-accumulation tank (12) exceeds a prescribed amount in the first air-storage step, the air compressed by a first compressor (10) is discharged outside without being stored in the pressure-accumulation tank (12). Therefore, it is possible to provide a compressed-air storage and power generation method by which fluctuating electrical power can (Continued)

be smoothed efficiently even after compressed air is stored up to the storage capacity of the storage space.

11 Claims, 4 Drawing Sheets

(51) Int. Cl.
  *H02J 15/00* (2006.01)
  *F02C 1/04* (2006.01)
  *F02C 6/06* (2006.01)

(52) U.S. Cl.
  CPC ...... *H02J 15/006* (2013.01); *F05D 2260/213* (2013.01); *F17C 2221/031* (2013.01); *F17C 2227/0327* (2013.01); *F17C 2270/0581* (2013.01); *Y02E 10/72* (2013.01); *Y02E 60/15* (2013.01)

(58) Field of Classification Search
  USPC .................................. 60/650, 659, 682–684
  See application file for complete search history.

(56) References Cited

U.S. PATENT DOCUMENTS

| | | | |
|---|---|---|---|
| 2010/0251712 A1* | 10/2010 | Nakhamkin | F01K 3/12 60/659 |
| 2010/0309244 A1* | 12/2010 | Yamada | B41J 2/0456 347/17 |
| 2011/0120107 A1* | 5/2011 | Schwark | B60K 6/12 60/327 |
| 2011/0127004 A1 | 6/2011 | Freund et al. | |
| 2012/0036853 A1 | 2/2012 | Kidd et al. | |
| 2012/0067047 A1* | 3/2012 | Peterson | C02F 1/22 60/651 |
| 2012/0085087 A1 | 4/2012 | Canal et al. | |
| 2012/0102937 A1 | 5/2012 | Anikhindi et al. | |
| 2013/0061591 A1 | 3/2013 | Bove et al. | |
| 2014/0208730 A1* | 7/2014 | Kraft | F15B 1/022 60/327 |
| 2015/0000248 A1* | 1/2015 | del Omo | F01K 3/00 60/39.182 |

FOREIGN PATENT DOCUMENTS

| | | |
|---|---|---|
| JP | 2012-097737 A | 5/2012 |
| JP | 2012-530213 A | 11/2012 |
| JP | 2013-064399 A | 4/2013 |
| JP | 2013-512410 A | 4/2013 |
| JP | 2013-536357 A | 9/2013 |

* cited by examiner

COMPRESSED AIR ENERGY STORAGE AND POWER GENERATION METHOD AND APPARATUS

TECHNICAL FIELD

The present invention relates to a compressed air energy storage and power generation method and a compressed air energy storage and power generation device.

BACKGROUND ART

In the power generation where solar energy such as photovoltaic power generation or solar thermal power generation is utilized, the generated power output is affected by a sunshine condition of the day to significantly fluctuate. For example, power cannot be generated during night-time, and generated power output significantly decreases in a rainy or cloudy day. Also, generated power output significantly fluctuates in a day in a sunshine condition from dawn to dusk or in a sunshine condition when it is clear and cloudy later.

In addition, in the wind power generation where a windmill is used, the generated power output significantly fluctuates according to changes of the wind direction or wind force of the day. In a power generation facility such as a wind farm with a group of windmills, power outputs generated by the respective windmills are added up and thereby the power generation fluctuation in a short period of time can be smoothed; however, the generated power output as a whole cannot be prevented from fluctuating.

A storage cell configured to, when power is excessively generated, store electricity and compensate for power shortage with the electricity is representative of the techniques to smooth or level such fluctuating and unstable generated power output. Chemical batteries such as sodium-sulfur batteries, redox flow batteries, lithium batteries, and lead batteries are known as examples of the storage battery. Any of the chemical batteries cannot absorb power beyond their capacities. Also, if the chemical batteries are fully charged to their capacities, the chemical batteries rapidly deteriorate. Therefore, some of the chemical batteries are regulated such that 80% to 90% of the capacity is set as an upper limit. The output by renewable energy such as solar light or wind power can be predicted to some extent but depends on natural phenomena. Therefore, the output generated beyond prediction cannot be prevented. In such a case, the storage battery may not perform the smoothing function, and if power cannot be supplied to a system, a photovoltaic power or wind power facility is disconnected from the system.

Currently, the storage battery is most typical as equipment for smoothing. However, the technology referred to as compressed air energy storage (CAES) is known as another piece of equipment for smoothing. CAES is configured to store, in place of electricity, compressed air discharged from a compressor when power is excessively generated and to reconvert the compressed air to electricity by an air turbine generator or the like when needed.

Typical prior arts in which this CAES technology is utilized are disclosed in Patent Documents 1 to 3.

CITATION LIST

Patent Document

Patent Document 1: Japanese Unexamined Patent Application Publication No. 2012-097737

Patent Document 2: Japanese Unexamined Patent Application Publication (Translation of PCT Application) No. 2013-512410

Patent Document 3: Japanese Unexamined Patent Application Publication (Translation of PCT Application) No. 2013-536357

SUMMARY OF THE INVENTION

However, any of the prior arts is based on the premise that unnecessary power during off-peak hours (which does not fluctuate as significantly as power generated by renewable energy fluctuates) is utilized to store compressed air in a large storage space such as an underground cave. Accordingly, the prior arts are not intended to smooth fluctuating power as in the power generation in which renewable energy such as solar light or wind power is used.

Further, the fact that the compressed air is stored up to the storage capacity of the storage space is not disclosed in any of the prior arts. In addition, there is no disclosure of the fact that fluctuating power is smoothed even after the compressed air is stored up to the storage capacity of the storage space.

It is thus an object of the present invention to provide a compressed air energy storage and power generation method and a compressed air energy storage and power generation device which can effectively smooth fluctuating power even after compressed air is stored up to the storage capacity of a storage space.

The present invention provides a compressed air energy storage and power generation method characterized by including: a first air compression step of driving a first compressor by fluctuating input power to compress air; a first air storage step of storing the air, compressed by the first compressor, in a first pressure accumulation tank; a first air supply step of supplying the compressed air from the first pressure accumulation tank to a first expander; a first power generation step of driving a first generator by the first expander to generate power; a first heat exchange step of performing heat exchange, in a first heat exchanger, between the air compressed by the first compressor and a heat medium to heat the heat medium; a heat medium storage step of storing the heat medium, heated in the first heat exchanger, in a heat medium tank; a second heat exchange step of performing heat exchange, in a second heat exchanger, between the compressed air supplied from the first pressure accumulation tank and the heat medium supplied from the heat medium tank to heat the compressed air; and an air discharge step of, when the amount of compressed air stored in the first pressure accumulation tank has exceeded a predefined amount during the first air storage step, discharging the air compressed by the first compressor to an outside without storing the compressed air in the first pressure accumulation tank.

According to this configuration, when the amount of compressed air stored in the first pressure accumulation tank has exceeded the predefined amount, the air compressed by the first compressor is discharged to the outside without being stored in the first pressure accumulation tank. Therefore, for example, even after the compressed air is stored in the first pressure accumulation tank up to the storage capacity of the first pressure accumulation tank, the fluctuating power can be effectively smoothed.

Here, in contrast with a chemical battery, the first pressure accumulation tank does not deteriorate even if the compressed air stored in the first pressure accumulation tank has exceeded 80% to 90% of the maximum storage capacity.

Therefore, "the predefined amount" can be defined as the maximum storage capacity of the first pressure accumulation tank. However, with a small margin of storage provided, "the predefined amount" may be set to a value of approximately 90% to 100% of the maximum storage capacity of the first pressure accumulation tank. Also, "the predefined amount" may be varied based on the amount of heat medium stored in the heat medium tank. In addition, a rate of the amount of compressed air stored in the first pressure accumulation tank (the storage capacity at the time) to the maximum storage capacity of the first pressure accumulation tank is defined as SOC (state of charge). The storage capacity that is the amount of compressed air stored in the first pressure accumulation tank can be directly or indirectly indicated, and the SOC may be calculated based on the inflow or outflow of compressed air with respect to the inside of the first pressure accumulation tank or may be calculated based on the pressure in the first pressure accumulation tank. Alternatively, the SOC can be set such that the minimum storage capacity in the first pressure accumulation tank capable of stably generating power is defined as 0% and such that the maximum storage capacity in the first pressure accumulation tank is defined as 100%. Furthermore, the SOC may be set such that the minimum pressure state in the first pressure accumulation tank capable of stably generating power is defined as 0% and such that the maximum pressure state in the first pressure accumulation tank is defined as 100%.

Also, "discharging to an outside" includes a case where the air compressed by the first compressor is discharged to the atmosphere and a case where the compressed air is introduced into a different compressor.

In the air discharge step, the air compressed by the first compressor may be heat-exchanged in the first heat exchanger with the heat medium to heat the heat medium, and the compressed air may be subsequently discharged to the outside.

Accordingly, even when the amount of compressed air stored in the first pressure accumulation tank has exceeded the predetermined amount, the amount of heat stored in the heat medium tank can be increased. Therefore, a portion of energy can be effectively stored. However, this is on the premise that the amount of heat medium stored in the heat medium tank has not reached the storage capacity of the heat medium tank.

In the air discharge step, the heat medium heated in the first heat exchanger may have reached a temperature equal to or higher than a predefined temperature and may be subsequently stored in the heat medium tank.

Thus, the temperature of the heat medium stored in the heat medium tank is raised to be equal to or higher than the predefined temperature and thereby the compressed air is heated in the second heat exchanger. Consequently, the power output generated at the time of power generation by the first expander can be increased. Here, the further the temperature of the compressed air is raised as far as the first expander and the heat medium endure, the further the generated power output per flow rate of the compressed air can be increased.

In the air discharge step, the air compressed by the first compressor may be discharged to the atmosphere.

Therefore, compared with, for example, a case where the air compressed by the first compressor is stored in a different tank, the compressed air can be inexpensively and easily discharged to the outside.

The compressed air energy storage and power generation method may further include: a second air compression step of compressing the air, compressed by the first compressor during the air discharge step, by a second compressor so that the compressed air is higher than a discharge pressure of the first compressor; a second air storage step of storing the air, compressed by the second compressor, in a second pressure accumulation tank; a second air supply step of supplying the compressed air from the second pressure accumulation tank to a second expander; and a second power generation step of driving a second generator by the second expander to generate power which is be supplied to a supply destination.

Thus, the air compressed by the first compressor is compressed by the second compressor so as to exceed the discharge pressure of the first compressor and then is stored in the second pressure accumulation tank. Therefore, the power that may be normally wasted can be stored as energy in the form of compressed air. Also, as the compressed air is stored at high pressure, the tank capacity can be reduced. Consequently, an increase of the space for storage tanks can be suppressed. Further, the compressed air from the second pressure accumulation tank is used to drive the second generator by the second expander; thereby, the power to be supplied to a supply destination is generated. Therefore, power can be generated even in a condition where power cannot be normally generated. As a result, if power is typically generated by the compressed air stored at high pressure, the charge and discharge efficiency decreases; however, at least the discharge efficiency can be increased.

The second generator may be driven by the second expander to generate power and the first compressor may be driven by the generated power.

Thus, the second generator is driven by the second expander to generate power and the first compressor can be driven by the generated power. Consequently, the amount of power purchased from a power system can be reduced.

Also, the present invention provides a compressed air energy storage and power generation device including: a first compressor configured to be driven by fluctuating input power and to compress air; a first pressure accumulation tank configured to be fluidly connected to the first compressor and to store the air compressed by the first compressor; a first expander configured to be fluidly connected to the first pressure accumulation tank and to be driven by the compressed air supplied from the first pressure accumulation tank; a first generator configured to be mechanically connected to the first expander and to generate power; a first heat exchanger configured to perform heat exchange between the air compressed by the first compressor and a heat medium to heat the heat medium; a heat medium tank configured to store the heat medium heated by the first heat exchanger; a second heat exchanger configured to perform heat exchange between the compressed air supplied from the first pressure accumulation tank and the heat medium supplied from the heat medium tank to heat the compressed air; a detector configured to detect the amount of compressed air stored in the first pressure accumulation tank; an air release valve adapted to be connected at an upstream side of the first pressure accumulation tank to discharge the air compressed by the first compressor to an outside; and a control device configured to, when the control device determines that the amount of compressed air stored in the first pressure accumulation tank has exceeded a predefined amount, control the air release valve to open so that the compressed air is discharged to the outside.

According to this configuration, when the amount of compressed air stored in the first pressure accumulation tank has exceeded the predefined amount, the air compressed by the first compressor is discharged to the outside without being stored in the first pressure accumulation tank. Therefore, in a case where the compressed air energy storage and power generation device is applied in smoothing of renewable energy in which power to be absorbed fluctuates, the fluctuating power can be effectively smoothed, for example, even after the compressed air is stored in the first pressure accumulation tank up to the storage capacity of the first pressure accumulation tank.

According to the present invention, when the amount of compressed air stored in the first pressure accumulation tank has exceeded the predefined amount, the air compressed by the first compressor is discharged to the outside. Therefore, even after the compressed air is stored in the first pressure accumulation tank up to the storage capacity of the first pressure accumulation tank, the fluctuating power can be effectively smoothed.

DESCRIPTION OF EMBODIMENTS

Hereinafter, embodiments of the present invention will be described with reference to the accompanying drawings.

First Embodiment

Figure 1:
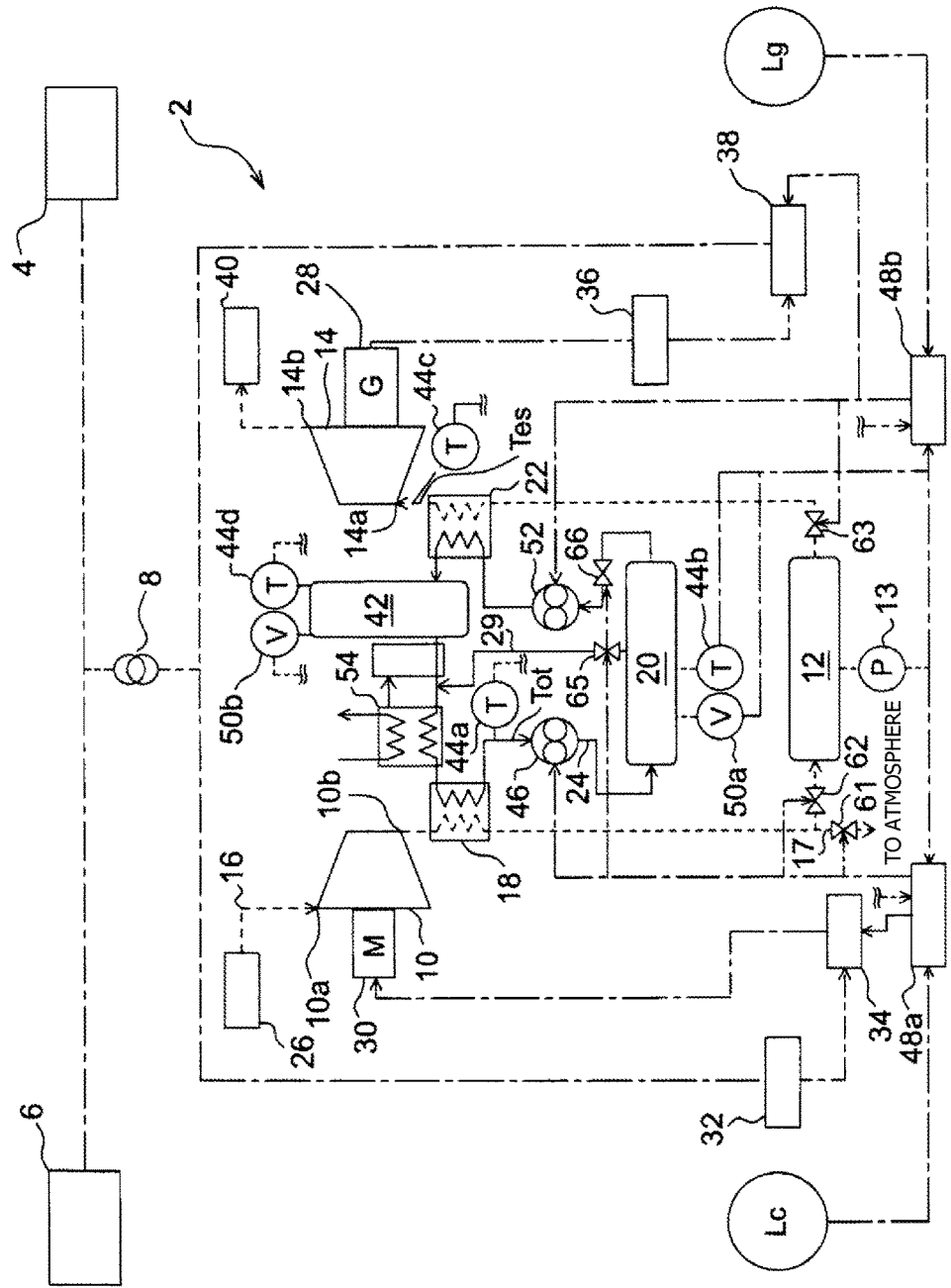
FIG. 1 is a schematic configuration diagram of a compressed air energy storage (CAES) and power generation device according to a first embodiment of the present invention.

FIG. 1 is a schematic configuration diagram of a compressed air energy storage (CAES) and power generation device 2. The CAES power generation device 2 of a first embodiment of the present invention is configured to, when power is generated by utilizing renewable energy, smooth the fluctuation of output with respect to a power system 4 as a supply destination and to output power in accordance with the fluctuation of demand power in the power system 4. The CAES power generation device 2 smooths power supplied from a power plant 6 using renewable energy, such as a wind power plant or a photovoltaic power plant, via a power receiving and transmitting facility 8 configured by a transformer or the like and then outputs the power to the power system 4 as the supply destination.

The configuration of the CAES power generation device 2 will be described with reference to FIG. 1.

The CAES power generation device 2 is provided with an air passage and a heat medium passage. A compressor 10, a pressure accumulation tank 12 (first pressure accumulation tank), and an expander 14 are mainly provided in the air passage. These are fluidly connected by air pipes 16 and air flows through the air pipes 16 (see short dashed lines in FIG. 1). A first heat exchanger 18, a heat medium tank 20, and a second heat exchanger 22 are mainly provided in the heat medium passage. These are fluidly connected by heat medium pipes 24 and a heat medium flows through the heat medium pipes 24 (see solid lines in FIG. 1).

First, the air passage will be described with reference to FIG. 1. In the air passage, air suctioned through an intake air filter 26 is compressed in the compressor 10 (a first compressor) [first air compression step] and then is stored in the pressure accumulation tank 12 [first air storage step]. The compressed air stored in the pressure accumulation tank 12 is supplied to the expander 14 (a first expander) and then is used in power generation by a generator 28 (a first generator).

The compressor 10 is a two-shaft screw compressor and is provided with a motor (an electric motor) 30. The motor 30 is mechanically connected to the compressor 10. Power (input power) generated in the power plant 6 is supplied via a converter 32 and an inverter 34 to the motor 30, and the motor 30 is driven by this power to operate the compressor 10. A discharge port 10b of the compressor 10 is fluidly connected through the air pipe 16 to the pressure accumulation tank 12. When the compressor 10 is driven by the motor 30, the compressor 10 suctions air through a suction port 10a thereof, compresses the air and discharges the compressed air through the discharge port 10b, and then pumps the compressed air to the pressure accumulation tank 12. The compressor 10 is a screw compressor in the present embodiment but may be a turbo or scroll compressor. Also, the single compressor 10 is provided in the present embodiment. Alternatively, a plurality of compressors 10 may be arranged in parallel with one another.

The pressure accumulation tank 12 stores the compressed air pumped from the compressor 10. Accordingly, energy can be accumulated as the compressed air in the pressure accumulation tank 12. The pressure accumulation tank 12 is fluidly connected through the air pipe 16 to the expander 14. Therefore, the compressed air stored in the pressure accumulation tank 12 is supplied to the expander 14. The storage pressure and storage capacity of the compressed air of the pressure accumulation tank 12 are defined by the amount of power to be stored in the pressure accumulation tank 12. Since the pressure accumulation tank 12 is generally large in capacity, it is difficult from a cost perspective that the pressure accumulation tank 12 is thermally insulated from outside air. Consequently, in order to prevent temperature loss due to discharge of the compressed air to the atmosphere, the storage temperature for the compressed air is set to be nearly the same as the atmospheric temperature or to be slightly higher or lower than the atmospheric temperature.

A pressure sensor 13 (detector) is installed at the pressure accumulation tank 12. A pressure Pt of the compressed air in the pressure accumulation tank 12 can be measured by the pressure sensor 13. A state of charge (SOC) of the pressure accumulation tank 12 can be calculated based on the pressure Pt. In this case, the minimum storage capacity in the pressure accumulation tank 12 capable of stably generating power may be defined as 0%, and the maximum storage capacity in the pressure accumulation tank 12 may be defined as 100%. Therefore, a remaining amount (storage capacity) of the compressed air in the pressure accumulation tank 12 capable of stably generating power can be easily checked.

In addition, respective flowmeter are provided at the air pipes 16 located upstream and downstream of the pressure accumulation tank 12 to obtain the amount of compressed air stored in the pressure accumulation tank 12 and thereby the SOC may be calculated. In other words, the amount of compressed air flowing into the pressure accumulation tank 12 and the amount of compressed air flowing out of the pressure accumulation tank 12 are measured by the respective flow meters to be added up. Therefore, the amount of compressed air stored in the pressure accumulation tank 12 is obtained based on a difference between the added values at the inlet and outlet sides of the pressure accumulation tank 12 and thus the SOC may be calculated from the obtained amount of compressed air and the maximum storage capacity of the pressure accumulation tank 12. In this case, a remaining amount (storage capacity) of the compressed air in the pressure accumulation tank 12 capable of stably generating power can be easily checked.

One end of a branched pipe 17 is connected to the air pipe 16 located upstream of the pressure accumulation tank 12, and the branched pipe 17 is communicated with the air pipe 16. The other end of the branched pipe 17 is opened to the atmosphere. The branched pipe 17 is positioned adjacent to the pressure accumulation tank 12. An air release valve 61 is provided in the branched pipe 17. A pressure accumulation tank inlet valve 62 is provided in the air pipe 16 located upstream of the pressure accumulation tank 12 and downstream of a portion of the air pipe 16 to which the branched pipe 17 is connected. Also, a pressure accumulation tank outlet valve 63 is provided in the air pipe 16 located downstream of the pressure accumulation tank 12. The pressure accumulation tank outlet valve 63 is positioned adjacent to the pressure accumulation tank 12.

The expander 14 is also a two-shaft screw expander and is provided with a generator 28. The generator 28 is mechanically connected to the expander 14. The compressed air is supplied to the expander 14 through a suction port 14a thereof and thus the expander 14 is operated by the compressed air supplied thereto to drive the generator 28 [first air supply step, first power generation step]. The generator 28 is electrically connected to the outside power system 4 (see alternate long and short dash lines in FIG. 1). Power generated by the generator 28 is supplied via a converter 36 and an inverter 38 to the power system 4 as the supply destination. In addition, the air expanded in the expander 14 is discharged from a discharge port 14b thereof via an exhaust gas silencer 40 to the outside. The expander 14 is a screw expander in the present embodiment but may be a turbo or scroll expander. Also, the single expander 14 is provided in the present embodiment. Alternatively, a plurality of expanders 14 may be arranged in parallel with one another.

Next, the heat medium passage will be described with reference to FIG. 1. In the heat medium passage, heat generated in the compressor 10 is stored in the heat medium in the first heat exchanger 18 [first heat exchange step]. Then, the heat medium in which the heat is stored is stored in the heat medium tank 20 [first heat medium storage step], and the heat is returned to the compressed air in the second heat exchanger 22 before the compressed air is expanded in the expander 14 [second heat exchange step]. The heat medium cooled to low temperature by heat exchange in the second heat exchanger 22 is supplied to a heat medium return tank 42. Then, the heat medium is supplied again from the heat medium return tank 42 to the first heat exchanger 18. Thus, the heat medium is circulated. Here, the heat medium is not limited to a particular kind. For example, a heat medium such as mineral oil or a glycol heat medium may be used and the operating temperature is approximately 150 degrees C. to 240 degrees C.

The first heat exchanger 18 is provided in the air pipe 16 located between the compressor 10 and the pressure accumulation tank 12. Accordingly, heat is transferred between the compressed air in the air pipe 16 and the heat medium in the heat medium pipe 24; thereby, compression heat generated in compression by the compressor 10 is stored in the heat medium. In other words, in the first heat exchanger 18, the temperature of the compressed air drops and the temperature of the heat medium rises. Here, the heat medium heated to high temperature is supplied through the heat medium pipe 24 to the heat medium tank 20.

A temperature sensor 44a for measuring the temperature of the heat medium heated to high temperature by heat exchange in the first heat exchanger 18 and a first pump 46 for allowing flow of the heat medium are provided in the heat medium pipe 24 extending from the first heat exchanger 18 to the heat medium tank 20. The first pump 46 may be any kind of pump. Alternatively, as long as the first pump 46 allows flow of the heat medium, the first pump 46 may be of any form. Also, the first pump 46 may not be located downstream of the first heat exchanger 18 but may be located upstream of the first heat exchanger 18. The first pump 46 is driven by a control device 48a, which will be described below, to regulate the flow rate of the heat medium that is to be heat-exchanged in the first heat exchanger 18. In place of the regulation of the flow rate of the heat medium by the first pump 46, the flow rate may be regulated by use of a pump (not shown) pumping at a constant flow rate and a flow rate regulating valve (not shown).

The heat medium stored in the heat medium tank 20 is maintained at a predetermined set heat storage temperature by the first pump 46; thereby, charge and discharge efficiency of the CAES power generation device 2 can be maintained at a high level. Specific causes of a decrease of the charge and discharge efficiency are as follows. If the power absorption of the compressor 10 varies, the amount of heat of the compressed air discharged from the compressor 10 varies. For example, if the power absorption of the compressor 10 is increased with the discharge pressure and the discharge temperature kept constant, the flow rate of the compressed air to be discharged increases. Therefore, if the flow rate of the heat medium to be heat-exchanged in the first heat exchanger 18 is kept constant, the temperature of the heat medium flowing into the heat medium tank 20 rises. In this case, the temperature of the heat medium rises above the set heat storage temperature, therefore decreasing the charge and discharge efficiency. On the other hand, if the power absorption of the compressor 10 is decreased, the temperature of the heat medium drops below the set heat storage temperature. Therefore, in this case, the charge and discharge efficiency decreases likewise. In order to prevent such a decrease, the first pump 46 is controlled to regulate the flow rate of the heat medium; thereby the charge and discharge efficiency is maintained at a high level.

The heat medium tank 20 is a steel tank, the circumference of which is covered by a heat insulating material insulated from the atmosphere. The heat medium tank 20 is configured to store the heat medium heated to high temperature in the first heat exchanger 18. A remaining amount sensor 50a is arranged at the heat medium tank 20; thereby, a volume Vt of the stored heat medium can be detected. For example, the remaining amount sensor 50a may be a fluid level sensor. Alternatively, without directly arranging a remaining amount sensor at the heat medium tank 20, a flow rate sensor for detecting the flow rate of the heat medium in the heat medium pipe may be arranged to determine the volume of the heat medium in the heat medium tank 20 from an added value of the volume. A temperature sensor 44b is further arranged at the heat medium tank 20; thereby, the temperature of the heat medium in the heat medium tank 20 can be measured. The heat medium stored in the heat medium tank 20 is supplied through the heat medium pipe 24 to the second heat exchanger 22.

A second pump 52 for allowing flow of the heat medium is provided in the heat medium pipe 24 extending from the heat medium tank 20 to the second heat exchanger 22. The second pump 52 may be any kind of pump and may be of any type. Also, the second pump 52 may not be located upstream of the second heat exchanger 22 but may be located downstream of the second heat exchanger 22. The second pump 52 is driven by a control device 48b, which will be described below, to regulate the flow rate of the heat medium that is to be heat-exchanged in the second heat exchanger 22. In place of the regulation of the flow rate of the heat medium by the second pump 52, the flow rate may be regulated by use of a pump pumping at a constant flow rate and a flow rate regulating valve.

The second heat exchanger 22 is provided in the air pipe 16 extending between the pressure accumulation tank 12 and the expander 14. Accordingly, the compressed air supplied from the pressure accumulation tank 12 to the expander 14 is heat-exchanged with the heat medium in the heat medium pipe 24; thereby, the compressed air is heated before the compressed air is expanded by the expander 14. In other words, in the second heat exchanger 22, the temperature of the compressed air rises and the temperature of the heat medium drops. A temperature sensor 44c for measuring the temperature of the inside compressed air is provided in the air pipe extending from the second heat exchanger 22 to a suction port 14a of the expander 14. Also, the heat medium cooled to low temperature in the second heat exchanger 22 is supplied through the heat medium pipe 24 to the heat medium return tank 42.

The heat medium return tank 42 is configured to store the heat medium cooled to low temperature by heat exchange in the second heat exchanger 22. Therefore, the temperature of the heat medium in the heat medium return tank 42 is usually lower than that of the heat medium in the heat medium tank 20.

A remaining amount sensor 50b and a temperature sensor 44d are arranged at the heat medium return tank 42 in the same way as at the heat medium tank 20. The heat medium stored in the heat medium return tank 42 is supplied through the heat medium pipe 24 to the first heat exchanger 18.

A heat medium cooler 54 is provided in the heat medium pipe 24 extending from the heat medium return tank 42 to the first heat exchanger 18. The heat medium cooler 54 of the present embodiment is a heat exchanger. The heat medium cooler 54 allows heat exchange between cooling water and the heat medium in the heat medium pipe 24 extending from the heat medium return tank 42 to the first heat exchanger 18; thereby, the temperature of the heat medium is lowered.

Thus, the temperature of the heat medium flowing into the first heat exchanger 18 can be maintained at a predetermined temperature by the heat medium cooler 54. Consequently, heat exchange in the first heat exchanger 18 can be stably performed and the charge and discharge efficiency can be increased.

A bypass pipe 29 establishing a connection between the heat medium pipe 24 from the heat medium cooler 54 to the first heat exchanger 18 and the heat medium tank 20 is provided. A bypass on-off valve 65 is provided in the bypass pipe 29. The bypass on-off valve 65 is opened; thereby, the heat medium in the heat medium tank 20 can be sent through the bypass pipe 29 to the first heat exchanger 18.

A heat medium tank outlet valve 66 is provided in the heat medium pipe 24 located downward of the heat medium tank 20 and upstream of the second pump 52.

As described above, the heat medium passage of the CAES power generation device 2 is configured.

Also, the CAES power generation device 2 includes the control devices 48a, 48b. Each of the control devices 48a, 48b is configured by hardware including a sequencer and the like and by software installed on the hardware. The control device 48a is electrically connected at least to the motor 30, the first pump 46, the air release valve 61, the pressure accumulation tank inlet valve 62, the bypass on-off valve 65, the heat medium tank outlet valve 66, and the power plant 6 (see the alternate long and short dash lines in FIG. 1). The control device 48b is electrically connected at least to the generator 28, the second pump 52, the pressure accumulation tank outlet valve 63, and the power system 4 (see the alternate long and short dash lines in FIG. 1). Accordingly, the operations of these valves and components are controlled by the control devices 48a, 48b. The pressure sensor 13, the temperature sensors 44a to 44d, and the remaining amount sensors 50a, 50b output measurement values to the control devices 48a, 48b. The control devices 48a, 48b can control the CAES power generation device 2 based on the measurement values. In the present embodiment, the control devices 48a, 48b are separately provided as the control device 48a for controlling the compression function and the control device 48b for controlling the expansion function. Alternatively, a single control device configured to control the compression and expansion functions may be provided.

The control devices 48a, 48b perform three control methods on the first pump 46 and the second pump 52. Any of the following three control methods may be used.

First, the first pump 46 is controlled based on the measurement value of the temperature sensor 44a so that a temperature Tot of the heat medium flowing out of the first heat exchanger 18 is constant, and the second pump 52 is controlled based on the measurement value of the temperature sensor 44c so that a temperature Tes of the compressed air supplied to the expander 14 is constant.

Specifically, when the temperature Tot of the heat medium, measured by the temperature sensor 44a is higher than the set heat storage temperature, the control device 48a controls to increase the rotation speed of the first pump 46 and increase the flow rate of the heat medium supplied to the first heat exchanger 18, therefore lowering the temperature Tot of the heat medium. Also, when the temperature Tes of the compressed air, measured by the temperature sensor 44c is higher than a set power generation temperature, the control device 48b controls to reduce the rotation speed of the second pump 52 and reduce the flow rate of the heat medium supplied to the second heat exchanger 22, therefore lowering the temperature Tes of the compressed air. When the temperature Tot of the heat medium is lower than the set heat storage temperature and when the temperature Tes of the compressed air is lower than the set power generation temperature, the reverse of the above operation is performed. Thus, the set heat storage temperature and the set power generation temperature are maintained.

The set heat storage temperature is a target temperature of the temperature Tot of the heat medium flowing out of the first heat exchanger 18. In this case, the charge and discharge efficiency of the whole system can be maximally increased. Also, the set power generation temperature is a target temperature of the temperature Tes of the compressed air supplied to the expander 14. In this case, the charge and discharge efficiency of the whole system can be maximally increased.

Second, the first pump 46 is controlled based on the rotation speed of the motor 30 so that the temperature Tot of the heat medium flowing out of the first heat exchanger 18 is constant, and the second pump 52 is controlled based on the rotation speed of the generator 28 so that the temperature Tes of the compressed air is constant.

Specifically, when the rotation speed of the motor 30 is increased above a predetermined value, the amount of compressed air discharged from the compressor 10 increases and the temperature Tot of the heat medium flowing out of the first heat exchanger 18 rises. Accordingly, the control device 48a controls to increase the rotation speed of the first pump 46 and increase the flow rate of the heat medium supplied to the first heat exchanger 18, therefore lowering the temperature Tot of the heat medium. Also, when the rotation speed of the generator 28 is increased above a predetermined value, the amount of compressed air used in the expander 14 increases and the temperature Tes of the compressed air supplied to the expander 14 drops. Accordingly, the control device 48b controls to increase the rotation speed of the second pump 52 and increase the flow rate of the heat medium supplied to the second heat exchanger 22, therefore raising the temperature Tes of the compressed air. When the rotation speed of the motor 30 is decreased below the predetermined vale and when the rotation speed of the generator 28 is decreased below the predetermined value, the reverse of the above operation is performed. Thus, the set heat storage temperature and the set power generation temperature are maintained. In this case, the temperature Tot of the heat medium is predicted from the rotation speed of motor 30 and thus the first pump 46 is controlled, and the temperature Tes of the compressed air is predicted from the rotation speed of the generator 28 and thus the second pump 52 is controlled. Therefore, the temperature sensors 44a, 44c are unnecessary. Alternatively, the sensors 44a, 44c may be provided to jointly use the first control method and the second control method.

Third, the first pump 46 is controlled based on a power absorption command value Lc so that the temperature Tot of the heat medium flowing out of the first heat exchanger 18 is constant, and the second pump 52 is controlled based on a generated power command value Lg so that the temperature Tes of the compressed air supplied to the expander 14 is constant.

The power absorption command value Lc is the amount of power required to drive the motor 30 and is determined based on the amount of charge required from the power plant 6. The generated power command value Lg is the amount of power to be generated in the generator 28 and is determined based on the power generation amount (demand power) required from the power system 4 as the supply destination. These values may be determined based on a predicted value of input power or a predicted value of demand power. These predicted values may be determined based on statistical data such as weather or climate conditions of the day, past climate conditions, and fluctuations with time of demand power. Also, in order to reduce power fluctuations in a system connection point, the predicted values may be determined based on changes of the amount of power such as voltage, electric current, or frequency in the system connection point so that the changes are cancelled out.

Specifically, the control device 48a issues a rotation speed command to the compressor 10 in reaction to the power absorption command value Lc. The rotation speed command can be computed by an inside discharge pressure, a discharge pressure at the discharge port, a suction temperature, a discharge temperature or the like in the compressor 10. For this computation, a pre-computed conversion table may be applied. Alternatively, computation may be performed in the control device 48a. The control device 48b issues a rotation speed command to the expander 14 in reaction to the generated power command value Lg. The rotation speed command can be computed by an inside discharge pressure, a discharge pressure at the discharge port, a suction temperature, a discharge temperature or the like in the expander 14. For this computation, a pre-computed conversion table may be applied. Alternatively, computation may be performed in the control device 48b. The rotation speed of the motor 30 is determined based on the power absorption command value Lc and the rotation speed of the generator 28 is determined based on the generated power command value Lg. Therefore, the first pump 46 is controlled based on the rotation speed of the motor 30 in the same way as in the second control method, and the second pump 52 is controlled based on the rotation speed of the generators 28 in the same way as in the second control method.

Also, the control devices 48a, 48b control the air release valve 61, the pressure accumulation tank inlet valve 62, and the pressure accumulation tank outlet valve 63 as follows.

In the air storage step of storing the air compressed by the compressor 10 in the pressure accumulation tank 12, the control devices 48a, 48b open the pressure accumulation tank inlet valve 62 and close the pressure accumulation tank outlet valve 63. The control devices 48a, 48b calculate the SOC of the pressure accumulation tank 12 based on a measurement value of the pressure sensor 13, that is, the pressure Pt of the compressed air in the pressure accumulation tank 12. The control devices 48a, 48b determine whether the amount of compressed air stored in the pressure accumulation tank 12 has exceeded the storage capacity of the pressure accumulation tank 12, that is, whether the SOC is 100%. When having determined that the SOC is 100%, the control devices 48a, 48b close the pressure accumulation tank inlet valve 62 and open the air release valve 61; therefore, the air compressed by the compressor 10 is discharged via the air pipe 16 and the branched pipe 17 to the atmosphere [air discharge step].

In addition, the air release valve 61 may be directly attached to the pressure accumulation tank 12. In this case, the compressed air is accumulated in the pressure accumulation tank 12 while being discharged therefrom; however, this contributes to the stabilization of the power system. Also, the temperature of the compressed air in the pressure accumulation tank 12 can be raised; therefore, the discharge efficiency can be increased.

In the air discharge step of discharging the air compressed by the compressor 10 to the atmosphere, if the heat medium tank 20 has enough capacity therein for storing heat, the first pump 46 is operated. Accordingly, the compressed air is heat-exchanged with the heat medium in the first heat exchanger 18 to heat the heat medium. In addition, even when the amount of compressed air stored in the pressure accumulation tank 12 exceeds the storage capacity of the pressure accumulation tank 12, the amount of heat to be stored in the heat medium tank 20 can be increased. Consequently, a portion of energy can be effectively stored.

If the heat storage temperature of the heat medium is lower than or equal to a predefined temperature, that is, a heatproof temperature of the heat medium or the expander 14, the circulation volume of the first pump 46 is decreased and thereby the heat storage temperature of the heat medium can be set to be higher than a predetermined value. Also, in this case, the heat medium tank outlet valve 66 is closed while the bypass on-off valve 65 is opened; thereby, the heat medium is circulated via the bypass pipe 29. Therefore, the temperature of the heat medium in the heat medium tank 20 can be raised.

Thus, the temperature of the heat medium stored in the heat medium tank is set to be equal to or higher than the predefined temperature and the compressed air is heated in the second heat exchanger 22. Therefore, the power output generated at the time of power generation by the expander 14 can be increased.

Further, the heat medium in the heat medium tank 20 may be directly heated by a heater (not shown) or the like. The power generated by the expander 14 may be used as power to be supplied to the heater or the like.

On the other hand, in the foregoing air discharge step, when the heat medium tank 20 does not have enough capacity therein for storing heat, the first pump 46 is stopped. Therefore, the compressed air is discharged via the air pipe 16 and the branched pipe 17 to the atmosphere without being heat-exchanged with the heat medium in the first heat exchanger 18. In this case, instead of directly discharging the compressed air at high temperature via the branched pipe 17 to the atmosphere, the compressed air may be discharged into water. Alternatively, the compressed air at high temperature may be passed through a cooler (not shown) to be subsequently discharged to the atmosphere. In general, the heat medium tank 20 is far smaller in size than the pressure accumulation tank 12. Therefore, it is not necessary that the heat storage capacity of the heat medium tank 20 is balanced with the amount of compressed air that can be stored in the pressure accumulation tank 12, and the heat medium tank 20 can have a large capacity therein for storing heat.

Figure 2:
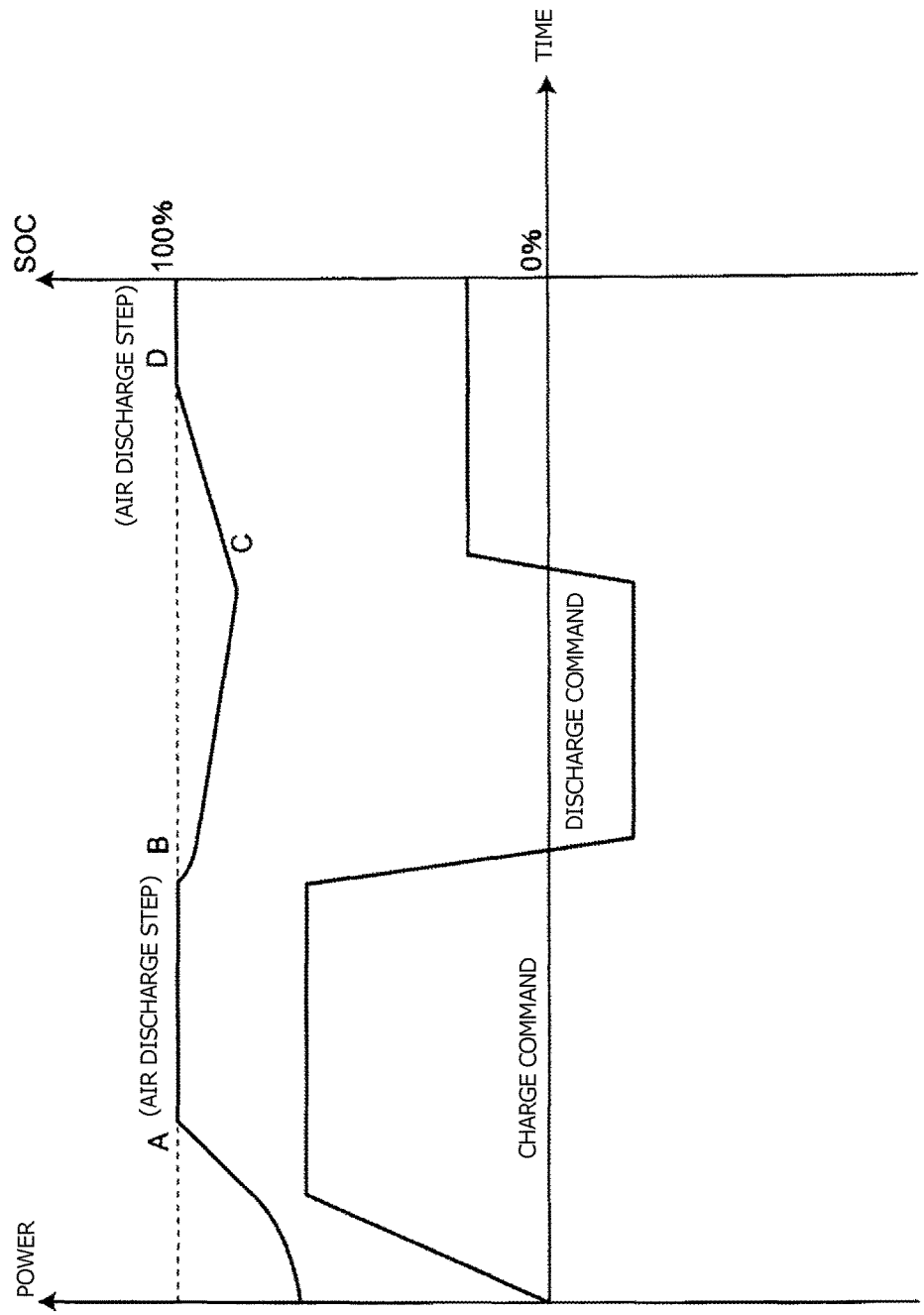
FIG. 2 is a graph showing an example of changes between power and SOC with time.

FIG. 2 shows an example of charge and discharge commands. Time is plotted on the horizontal axis and the power absorption command value or the generated power command value is plotted on the vertical axis on the left side. The charge command is plotted on the positive side and the discharge command is plotted on the negative side. The SOC is plotted on the vertical axis at the right side. The SOC is a rate of the amount of compressed air stored in the pressure accumulation tank 12 to the storage capacity of the pressure accumulation tank 12.

In a case where a screw compressor is applied as in the embodiment of FIG. 1, the amount of power to be absorbed, the rotation speed of the screw compressor, and the amount of discharged compressed air vary substantially proportionately.

As shown in FIG. 2, when the charge command linearly rises up, the SOC increases while drawing a curve recessed downward. Also, when the charge command becomes stable, the SOC linearly increases.

Point A in FIG. 2 corresponds to when the SOC becomes equal to the storage capacity of the pressure accumulation tank 12 (SOC=100%). At point A in time, the air release valve 61 is opened and thereby the air compressed by the compressor 10 is discharged to the atmosphere (air discharge step). At a point (point B in FIG. 2) in time when the charge command is switched to the discharge command, power generation by the expander 14 starts and the SOC starts decreasing from 100%.

Afterward, at point (point C in FIG. 2) in time when the discharge command is switched to the charge command, the air release valve 61 is closed and the compressed air is stored in the pressure accumulation tank 12. Then, at a point (point D in FIG. 2) in time when the SOC has reached 100% again, the compressed air starts to be discharged to the atmosphere in accordance with the foregoing air discharge step.

If the heat medium tank 20 has enough capacity therein for storing heat in a time between point A and point B in FIG. 2, the heat medium is continuously stored in the heat medium tank 20. Also, at this time, the temperature of the heat medium stored in the heat medium tank 20 can be raised.

According to the foregoing configuration, when the amount of compressed air stored in the pressure accumulation tank 12 has exceeded the storage capacity of the pressure accumulation tank 12, the air compressed by the compressor 10 is discharged to the atmosphere without being stored in the pressure accumulation tank 12. Therefore, even after the compressed air is stored up to the storage capacity of the pressure accumulation tank 12, smoothing can be effectively performed.

In addition, the air release valve 61 and the like are controlled by the control devices 48*a*, 48*b*. Alternatively, for example, the air release valve may be manually controlled.

Second Embodiment

Figure 3:
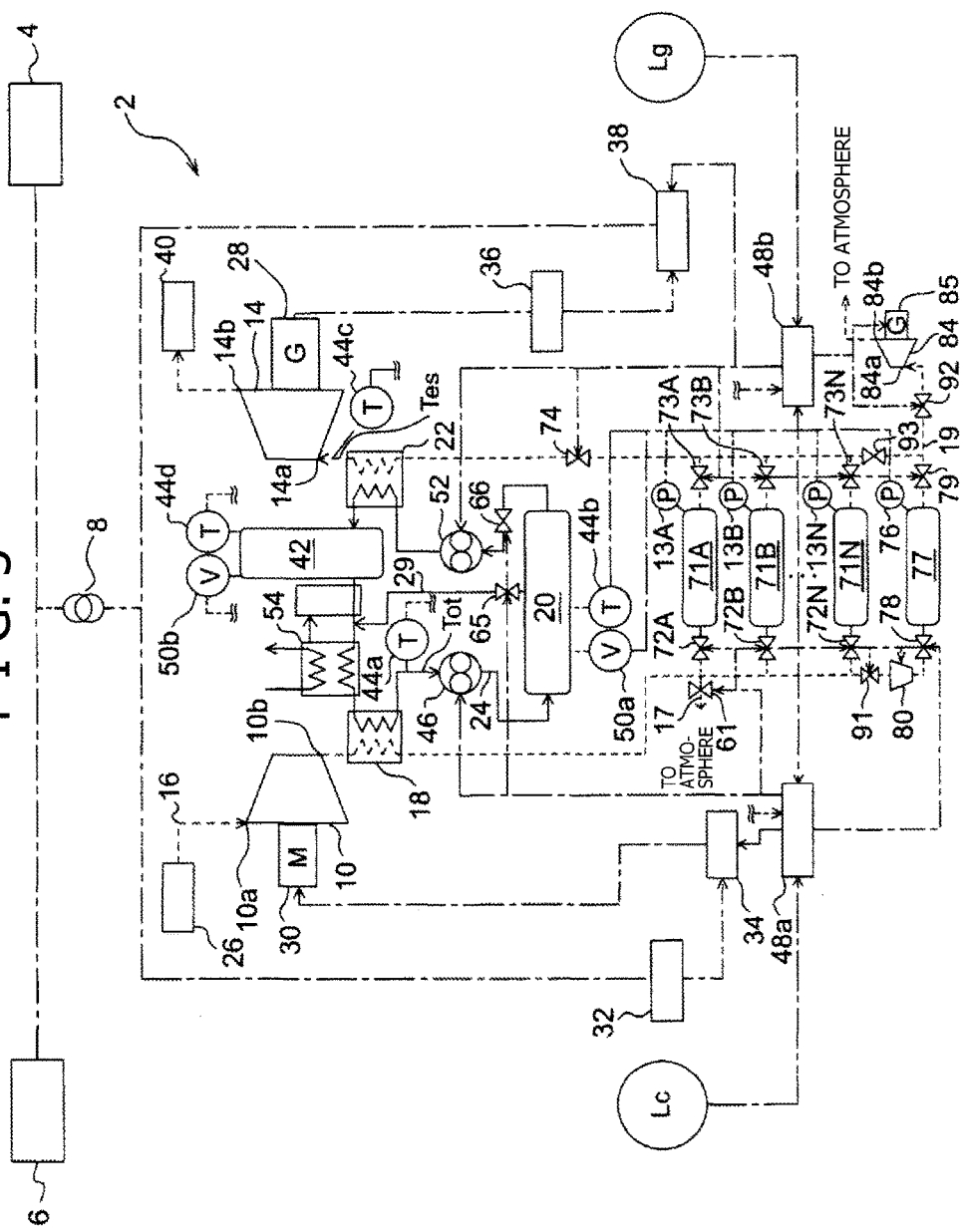
FIG. 3 is a schematic view of the compressed air energy storage (CAES) and power generation device according to a second embodiment of the present invention.

FIG. 3 is a schematic view of the CAES power generation device 2 according to a second embodiment. The CAES power generation device 2 of the second embodiment further includes N sets of first pressure accumulation tanks 71A, 71B, . . . , 71N, a second pressure accumulation tank 77, a second compressor 80, a second expander 84, and a second generator 85. Other configurations of the second embodiment are substantially the same as those of the first embodiment of FIG. 1. Therefore, the same configurations as those shown in FIG. 1 will not be described.

As shown in FIG. 3, the first pressure accumulation tanks 71A, 71B, . . . , 71N and the second pressure accumulation tank 77 are connected to the air pipe 16 so as to be in parallel with one another. Commercial standard tanks are used as the first pressure accumulation tanks 71A, 71B, . . . , 71N; thereby, an inexpensive configuration can be provided compared with a case where a single large tank is provided. The second pressure accumulation tank 77 is configured so as to store compressed air at higher pressure than that in the first pressure accumulation tanks 71A, 71B, . . . , 71N.

Respective first pressure accumulation tank inlet valves 72A to 72N are provided in the air pipes 16 located upstream of the first pressure accumulation tanks 71A, 71B, . . . , 71N. Also, respective first pressure accumulation tank outlet valves 73A to 73N are provided in the air pipes 16 located downstream of the first pressure accumulation tanks 71A, 71B, . . . , 71N. A pressure accumulation tank outlet valve 74 is provided in the air pipe 16 located downstream of the first pressure accumulation tank outlet valves 73A to 73N. A second pressure accumulation tank inlet valve 78 is provided in the air pipe 16 located upstream of the second pressure accumulation tank 77. A second pressure accumulation tank outlet valve 79 is provided in the air pipe 16 located downstream of the second pressure accumulation tank 77. A decompression valve 93 is provided in the air pipe 16 located between the first pressure accumulation tank outlet valves 73A to 73N and the second pressure accumulation tank outlet valve 79.

The first pressure accumulation tank inlet valves 72A to 72N are valves for storing compressed air selectively in the first pressure accumulation tanks 71A, 71B, . . . , 71N. Also, the first pressure accumulation tank outlet valves 73A to 73N are valves for supplying the compressed air selectively from the first pressure accumulation tanks 71A, 71B, . . . , 71N. The decompression valve 93 is a valve for reducing the pressure of the compressed air accumulated in the second pressure accumulation tank 77 to the pressure in the first pressure accumulation tanks 71A, 71B, . . . , 71N.

Respective pressure sensors 13A to 13N are provided at the first pressure accumulation tanks 71A, 71B, . . . , 71N. A pressure sensor 76 is provided at the second pressure accumulation tank 77. The pressure of the compressed air in the first pressure accumulation tanks 71A, 71B, . . . , 71N can be measured by the respective pressure sensors 13A to 13N and the pressure of the compressed air in the second pressure accumulation tank 77 can be measured by the pressure sensor 76.

The second compressor 80 is provided downstream of the first pressure accumulation tanks 71A, 71B, . . . , 71N and upstream of the second pressure accumulation tank 77. A second compressor inlet valve 91 is provided in the air pipe 16 located upstream of the second compressor 80. The second compressor 80 is a compressor that can discharge the compressed air at higher pressure than that in the compressor 10. In the case of the present embodiment, a reciprocating compressor is used but a turbo or screw compressor may be used. If a discharge pressure of the compressor 10 is set at 0.98 MPa, a discharge pressure of the second compressor 80 can be set at approximately 4.5 MPa to 25 MPa.

One end of a branched pipe 19 is connected to the air pipe 16 located downstream of the second pressure accumulation tank 77 and the other end of the branched pipe 19 is connected to a suction port 84a of the second expander 84.

A second expander inlet valve 92 is provided in the branched pipe 19 located upstream of the second expander 84. The second expander 84 is a screw expander and is provided with the second generator 85. The second generator 85 is mechanically connected to the second expander 84. The compressed air stored in the second pressure accumulation tank 77 is supplied from the suction port 84a to the second expander 84, and the second expander 84 is operated by the supplied compressed air to drive the second generator 85. The second generator 85 is electrically connected to the compressor 10 and the outside power system 4. In addition, the air expanded in the second expander 84 is discharged from a discharge port 84b via an exhaust gas silencer (not shown) to the outside. The second expander 84 is a screw expander in the present embodiment but may be a turbo or scroll expander.

The control device 48a is electrically connected to the first pressure accumulation tank inlet valves 72A to 72N, the second pressure accumulation tank inlet valve 78, the second compressor inlet valve 91, and the second compressor 80 (see alternate long and short dash lines in FIG. 3). The control device 48b is electrically connected to the second generator 85, the first pressure accumulation tank outlet valves 73A to 73N, the pressure accumulation tank outlet valve 74, the second pressure accumulation tank outlet valve 79, and the second expander inlet valve 92 (see alternate long and short dash lines in FIG. 3). Accordingly, the operations of these valves and devices are controlled by the control devices 48a, 48b. The pressure sensors 13A to 13N, 76 output measurement values to the control devices 48a, 48b. The control devices 48a, 48b can control the CAES power generation device 2 based on the measurement values.

The control devices 48a, 48c control the first pressure accumulation tank inlet valves 72A to 72N, the second pressure accumulation tank inlet valve 78, the second compressor inlet valve 91, the second compressor 80, the second generator 85, the first pressure accumulation tank outlet valves 73A to 73N, the pressure accumulation tank outlet valve 74, the second pressure accumulation tank outlet valve 79, and the second expander inlet valve 92 as follows.

First, in an air storage step of storing the air compressed by the compressor 10 in the first pressure accumulation tanks 71A, 71B, . . . , 71N, the control devices 48a, 48b open the first pressure accumulation tank inlet valve 72A and close the first pressure accumulation tank outlet valve 73A. Also, the control devices 48a, 48b close the first pressure accumulation tank inlet valves 72B to 72N and the second compressor inlet valve 91. The control devices 48a, 48b calculate the SOC of the first pressure accumulation tank 71A based on the measurement value of the pressure sensor 13A, that is, the pressure of the compressed air in the first pressure accumulation tank 71A. The control devices 48a, 48b determine whether the amount of compressed air stored in the first pressure accumulation tank 71A has exceeded the storage capacity of the first pressure accumulation tank 71A, that is, whether the SOC is 100%. When having determined that the SOC is 100%, the control devices 48a, 48b close the first pressure accumulation tank inlet valve 72A and open the first pressure accumulation tank inlet valve 72B; therefore, the air compressed by the compressor 10 is stored in the first pressure accumulation tank 71B.

Thus, in the air storage step, the air compressed by the compressor 10 is sequentially stored in the first pressure accumulation tanks 71A, 71B, . . . , 71N until the SOC reaches 100%.

When the SOC of the first pressure accumulation tank 71N has reached 100%, the control devices 48a, 48b close the first pressure accumulation tank inlet valve 72N, open the second pressure accumulation tank inlet valve 78 and the second compressor inlet valve 91, and drive the second compressor 80. The air is compressed by the second compressor 80 so that the pressure thereof is higher than the discharge pressure of the compressor 10; thereafter, the compressed air is stored in the second pressure accumulation tank 77. The power to drive the second compressor 80 may be supplied from a commercial power system. Alternatively, power generated by the expander 14 may be used as the power to drive the second compressor 80.

When the SOC of the second pressure accumulation tank 77 has reached 100%, the control devices 48a, 48b close the second pressure accumulation tank inlet valve 78 and the second compressor inlet valve 91 and open the air release valve 61, therefore discharging the air compressed by the compressor 10 from the air pipe 16 and the branched pipe 17 to the atmosphere.

At the time of using the second expander 84, the control device 48b closes the first pressure accumulation tank outlet valves 73A to 73N and the pressure accumulation tank outlet valve 74 and opens the second pressure accumulation tank outlet valve 79 and the second expander inlet valve 92. At this time, the compressed air accumulated in the second pressure accumulation tank 77 is introduced via the air pipe 16 and the branched pipe 19 to the second expander 84 and power is generated by the second generator 85 directly connected to the second expander 84. The generated power may be returned to the power system or may be used as the power to drive the compressor 10 (the first compressor).

Thus, the air compressed by the compressor 10 is compressed by the second compressor 80 so as to exceed the discharge pressure of the compressor 10 and then is stored in the second pressure accumulation tank 77. Therefore, the power that may be normally wasted can be stored as energy in the form of compressed air. Also, the compressed air is stored at high pressure; therefore, the tank capacity can be reduced. Consequently, an increase of the space for storage tanks can be inhibited. Further, the compressed air from the second pressure accumulation tank 77 is used to drive the second generator 85 by the second expander 84; thereby, the power to be supplied to a supply destination is generated. Therefore, power can be generated even in a condition where power cannot be normally generated. As a result, if power is typically generated by compressed air stored at high pressure, the charge and discharge efficiency decreases; however, at least the discharge efficiency can be increased compared with a case where nothing is provided.

In addition, the compressed air accumulated in the second pressure accumulation tank 77 is depressurized by the decompression valve 93 and then the expander 14 may generate power.

Also, the control devices 48a, 48b control the first pressure accumulation tank inlet valves 72A to 72N, the first pressure accumulation tank outlet valves 73A to 73N, and the like but not limited thereto. For example, the first pressure accumulation tank inlet valves, the first pressure accumulation tank outlet valves, and the like may be manually controlled.

Third Embodiment

Figure 4:
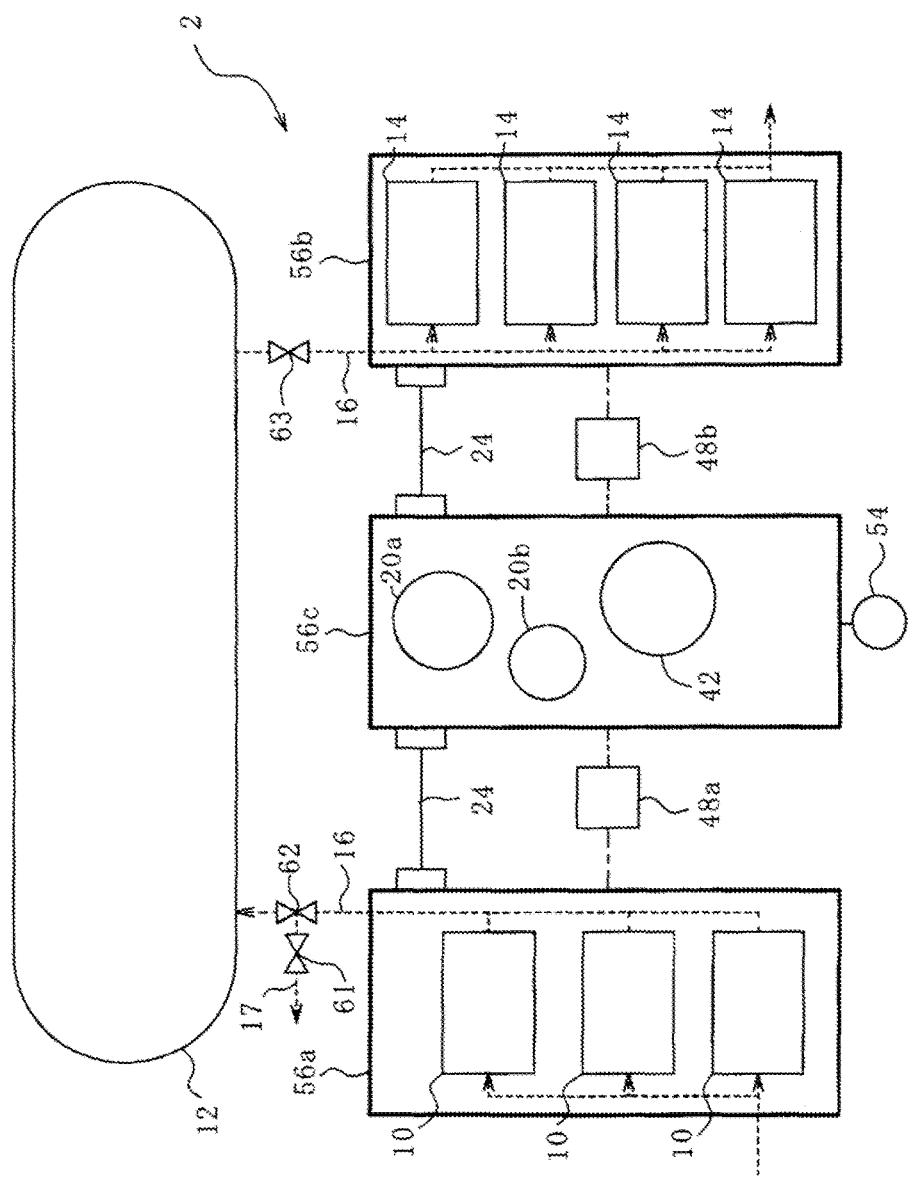
FIG. 4 is a schematic view of the compressed air energy storage (CAES) and power generation device according to a third embodiment of the present invention.

FIG. 4 shows a schematic view of the CAES power generation device 2 of a third embodiment. The CAES power generation device 2 of the third embodiment is different from that of the first embodiment in that plural compressors 10, plural expanders 14, and heat medium tanks 20a, 20b are arranged and components are housed in containers 56a to 56c; however, other configurations of the CAES power generation device 2 of the third embodiment are substantially the same as those of the first embodiment shown in FIG. 1. Therefore, the same configurations as those shown in FIG. 1 will not be described. Also, since FIG. 4 is a schematic view, all of the components of the CAES power generation device 2 are not necessarily shown.

As referred to FIG. 4, the CAES power generation device 2 of the present embodiment includes the three compressors 10 and the four expanders 14. The three compressors 10 are fluidly connected in parallel with one another, and the four expanders 14 are also fluidly connected in parallel with one another. The number of compressors 10 to be driven and the number of expanders 14 to be driven may be changed in accordance with input power or demand power; therefore, smoothing can be widely and effectively performed.

The CAES power generation device 2 of the present embodiment includes the high-temperature heat medium tank 20a and the low-temperature heat medium tank 20b, and a heat medium heat-exchanged in the first heat exchanger 18 is stored in the high-temperature heat medium tank 20a and the low-temperature heat medium tank 20b according to the temperature of the heat medium. Accordingly, the heat medium is heat-exchanged at a necessary temperature in the second heat exchanger 22, therefore increasing the discharge efficiency.

In the present embodiment, most of the components of the CAES power generation device 2 are housed in the containers 56a to 56c. In particular, the containers 56a to 56c are installed in such a way as to be divided into three groups, that is, the container 56a related to compression function such as the compressors 10 and the first heat exchanger 18 (not shown), the container 56b related to expansion function such as the expanders 14 and the second heat exchanger 22 (not shown), and the container 56c related to heat storage function such as the heat medium tanks 20a, 20b. Thus, the components are housed in the containers 56a to 56c; thereby, the installation cost of the CAES power generation device 2 can be significantly reduced.

Also, in an example of FIG. 4, the capacitance of approximately 500 kW is provided at each of charge and discharge sides. A charge and discharge unit is configured by the containers 56a to 56c, thereby enabling easy transportation and installation. In addition, the installation capacity can be selectively increased and decreased. For example, the three containers 56a to 56c are made as one set and six sets are installed; thereby, 3 MW equipment as a whole can be configured.

Also, the air release valve 61 may be provided in the branched pipe 17 branched from the air pipe 16 located between the pressure accumulation tank 12 and the container 56a, and the pressure accumulation tank inlet valve 62 may be provided in the air pipe 16 located between the branched pipe 17 and the pressure accumulation tank 12.

In installing in such a container, a duct (not shown) having a silencer may be arranged in an opening of the air release valve 61. Also, if the second compressor 80 and the second expander 84 are provided as in an example of FIG. 3, the second compressor 80 and the second expander 84 may be collectively housed as a high-voltage unit in a separate container.

Throughout the first to third embodiments, "fluctuating power" of the present invention is not only related to renewable energy but may be related to smoothing or peak shaving of demand power in plant facilities.

EXPLANATION OF REFERENCE NUMERALS

2 Compressed air energy storage and power generation device (CAES power generation device)
4 Power system
6 Power plant
8 Power receiving and transmitting facility
10 Compressor (first compressor)
10a Suction port
10b Discharge port
12 Pressure accumulation tank (first pressure accumulation tank)
13 Pressure sensor (detector)
14 Expander (first expander)
14a Suction port
14b Discharge port
16 Air pipe
18 First heat exchanger
20, 20a, 20b Heat medium tank
22 Second heat exchanger
24 Heat medium pipe
26 Intake air filter
28 Generator (first generator)
30 Motor (electric motor)
32, 36 Converter
34, 38 Inverter
40 Exhaust gas silencer
42 Heat medium return tank
44a Temperature sensor
44b, 44d Temperature sensor
44c Temperature sensor
46 First pump
48a, 48b Control device
50a, 50b Remaining amount sensor
52 Second pump
54 Heat medium cooler 56a, 56b, 56c Container
61 Air release valve
71A, 71B, . . . , 71N First pressure accumulation tank
77 Second pressure accumulation tank
80 Second compressor
84 Second expander
85 Second generator

The invention claimed is:

1. A compressed air energy storage and power generation method comprising:
   a first air compression step of driving a first compressor by fluctuating input power to compress air;
   a first air storage step of storing the air, compressed by the first compressor, in a first pressure accumulation tank;
   a first air supply step of supplying the compressed air from the first pressure accumulation tank to a first expander;
   a first power generation step of driving a first generator by the first expander to generate power;
   a first heat exchange step of performing heat exchange, in a first heat exchanger, between the air compressed by the first compressor and a heat medium to heat the heat medium;
   a heat medium storage step of storing the heat medium, heated in the first heat exchanger, in a heat medium tank;
   a second heat exchange step of performing heat exchange, in a second heat exchanger, between the compressed air supplied from the first pressure accumulation tank and the heat medium supplied from the heat medium tank to heat the compressed air; and
   an air discharge step of, when the amount of compressed air stored in the first pressure accumulation tank has exceeded a predefined amount during the first air storage step, discharging the air compressed by the first compressor to an outside before entering into the first pressure accumulation tank.

2. The compressed air energy storage and power generation method according to claim 1, wherein in the air discharge step, the air compressed by the first compressor is heat-exchanged in the first heat exchanger with the heat medium to heat the heat medium, and the compressed air is subsequently discharged to the outside.

3. The compressed air energy storage and power generation method according to claim 2, wherein in the air discharge step, the heat medium heated in the first heat exchanger has reached a temperature equal to or higher than a predefined temperature and is subsequently stored in the heat medium tank.

4. The compressed air energy storage and power generation method according to claim 1, wherein in the air discharge step, the air compressed by the first compressor is discharged to the atmosphere.

5. The compressed air energy storage and power generation method according to claim 1, further comprising:
   a second air compression step of compressing the air, compressed by the first compressor during the air discharge step, by a second compressor so that the compressed air is higher than a discharge pressure of the first compressor;
   a second air storage step of storing the air, compressed by the second compressor, in a second pressure accumulation tank;
   a second air supply step of supplying the compressed air from the second pressure accumulation tank to a second expander; and
   a second power generation step of driving a second generator by the second expander to generate power which is to be supplied to a supply destination.

6. The compressed air energy storage and power generation method according to claim 5, wherein the second generator is driven by the second expander to generate power and the first compressor is generated by the generated power.

7. A compressed air energy storage and power generation device comprising;
   a first compressor configured to be driven by fluctuating input power and to compress air;
   a first pressure accumulation tank configured to be fluidly connected to the first compressor and to store the air compressed by the first compressor;
   a first expander configured to be fluidly connected to the first pressure accumulation tank and to be driven by the compressed air supplied from the first pressure accumulation tank;
   a first generator configured to be mechanically connected to the first expander and to generate power;
   a first heat exchanger configured to perform heat exchange between the air compressed by the first compressor and a heat medium to heat the heat medium;
   a heat medium tank configured to store the heat medium heated by the first heat exchanger;
   a second heat exchanger configured to perform heat exchange between the compressed air supplied from the first pressure accumulation tank and the heat medium supplied from the heat medium tank to heat the compressed air;
   a detector configured to detect the amount of compressed air stored in the first pressure accumulation tank;
   an inlet valve provided between the first compressor and the first pressure accumulation tank;
   an air release valve adapted to be connected at an upstream side of the first pressure accumulation tank to discharge the air compressed by the first compressor to an outside; and
   a control device configured to, when the control device determines that the amount of compressed air stored in the first pressure accumulation tank has exceeded a predefined amount, control the inlet valve to close and the air release valve to open so that the compressed air is discharged to the outside.

8. The compressed air energy storage and power generation method according to claim 2, wherein in the air discharge step, the air compressed by the first compressor is discharged to the atmosphere.

9. The compressed air energy storage and power generation method according to claim 3, wherein in the air discharge step, the air compressed by the first compressor is discharged to the atmosphere.

10. The compressed air energy storage and power generation method according to claim 2, further comprising:
    a second air compression step of compressing the air, compressed by the first compressor during the air discharge step, by a second compressor so that the compressed air is higher than a discharge pressure of the first compressor;
    a second air storage step of storing the air, compressed by the second compressor, in a second pressure accumulation tank;
    a second air supply step of supplying the compressed air from the second pressure accumulation tank to a second expander; and a second power generation step of driving a second generator by the second expander to generate power which is to be supplied to a supply destination.

11. The compressed air energy storage and power generation method according to claim 3, further comprising:
- a second air compression step of compressing the air, compressed by the first compressor during the air discharge step, by a second compressor so that the compressed air is higher than a discharge pressure of the first compressor;
- a second air storage step of storing the air, compressed by the second compressor, in a second pressure accumulation tank;
- a second air supply step of supplying the compressed air from the second pressure accumulation tank to a second expander; and
- a second power generation step of driving a second generator by the second expander to generate power which is to be supplied to a supply destination.

* * * * *